United States Patent
Mitsutake et al.

(10) Patent No.: US 8,867,109 B2
(45) Date of Patent: Oct. 21, 2014

(54) LIGHT GUIDE, ILLUMINATION DEVICE, AND IMAGE READING APPARATUS

(75) Inventors: Ikutaro Mitsutake, Utsunomiya (JP); Takeyoshi Saiga, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/612,996

(22) Filed: Sep. 13, 2012

(65) Prior Publication Data

US 2013/0083369 A1    Apr. 4, 2013

(30) Foreign Application Priority Data

Sep. 29, 2011   (JP) ................ 2011-214417

(51) Int. Cl.
H04N 1/04 (2006.01)
H04N 1/028 (2006.01)

(52) U.S. Cl.
CPC ....... H04N 1/02855 (2013.01); H04N 1/02865 (2013.01); H04N 1/0289 (2013.01)
USPC ............ 358/475; 358/474; 358/484; 358/497

(58) Field of Classification Search
USPC ......................... 358/475, 474, 484, 497, 483
See application file for complete search history.

(56) References Cited

U.S. PATENT DOCUMENTS

| | | | | |
|---|---|---|---|---|
| 8,035,868 B2 * | 10/2011 | Kaneko | .......................... | 358/475 |
| 8,310,737 B2 * | 11/2012 | Nagao et al. | ................... | 358/475 |
| 2008/0225522 A1 * | 9/2008 | Ito | ................................. | 362/247 |
| 2009/0080038 A1 | 3/2009 | Hayashide et al. | | |
| 2010/0253880 A1 * | 10/2010 | Sasaki et al. | .................... | 349/64 |
| 2011/0063870 A1 | 3/2011 | Nomoto et al. | | |

FOREIGN PATENT DOCUMENTS

| | | |
|---|---|---|
| CN | 101325640 A | 12/2008 |
| CN | 101329423 A | 12/2008 |
| CN | 201159778 Y | 12/2008 |
| CN | 102022696 A | 4/2011 |
| JP | 2005156600 A | 6/2005 |
| JP | 2009010699 A | 1/2009 |
| JP | 2009080173 A | 4/2009 |

OTHER PUBLICATIONS

Chinese Office Action issued in Chinese counterpart application No. CN201210363606.2, dated Jan. 16, 2014. English translation provided.

Chinese Office Action cited in Chinese counterpart application No. CN201210363606.2, dated Aug. 7, 2014. English translation provided.

* cited by examiner

*Primary Examiner* — Houshang Safaipour
(74) *Attorney, Agent, or Firm* — Rossi, Kimms & McDowell LLP (57) ABSTRACT

Provided is a light guide, in which: at least one of a reflecting part or a light exit part has a light condensing action in a direction intersecting a predetermined direction; the at least one of the reflecting part or the light exit part includes diffusing parts arranged in the predetermined direction; the diffusing parts include: a first curved surface having a first degree of diffusion in the predetermined direction for a sparse region of light sources; and a second curved surface having a second degree of diffusion, which is lower than the first degree of diffusion, in the predetermined direction for a dense region of the light sources; and each of the first curved surface and the second curved surface has a shape corresponding to a part of a cylinder extending in a direction orthogonal to the predetermined direction in which the light sources are arrayed.

20 Claims, 13 Drawing Sheets

| LED POSITION | REGION | PITCH |
|---|---|---|
| -155.4 | a | 0.35 |
| -149.8 | | |
| -144.2 | b | 0.42 |
| -137.5 | | |
| -130.8 | c | 0.51 |
| -122.8 | | |
| -114.8 | d | 0.52 |
| -106.7 | e | 0.56 |
| -98 | f | 0.57 |
| -89.1 | g | 0.59 |
| -79.9 | h | 0.62 |
| -70.3 | i | 0.63 |
| -60.5 | j | 0.66 |
| -50.3 | | |
| -40.1 | k | 0.69 |
| -29.5 | | |
| -18.9 | l | 0.70 |
| -8.1 | | |
| 2.7 | | |
| 13.5 | | |
| 24.2 | m | 0.69 |
| 34.8 | | |
| 45.2 | n | 0.66 |
| 55.4 | | |
| 65.4 | o | 0.63 |
| 75.1 | p | 0.62 |
| 84.5 | q | 0.59 |
| 93.55 | r | 0.57 |
| 102.35 | s | 0.56 |
| 110.75 | t | 0.52 |
| 118.8 | u | 0.51 |
| 126.8 | | |
| 134.15 | v | 0.42 |
| 140.85 | | |
| 147 | w | 0.35 |
| 152.6 | | |

| LED POSITION | REGION | PITCH |
|---|---|---|
| -155.7 | a | 0.22 |
| -151.3 | | |
| -146.9 | | |
| -142.4 | | |
| -137.9 | b | 0.23 |
| -132.3 | | |
| -126.7 | c | 0.25 |
| -120.9 | | |
| -115.1 | d | 0.29 |
| -108.9 | e | 0.31 |
| -102.5 | f | 0.34 |
| -95.9 | g | 0.36 |
| -89.1 | | |
| -82.3 | h | 0.41 |
| -75 | | |
| -67.7 | i | 0.44 |
| -60.1 | | |
| -52.5 | j | 0.46 |
| -44.7 | k | 0.48 |
| -36.7 | | |
| -28.7 | l | 0.5 |
| -20.5 | | |
| -12.3 | | |
| -4.1 | | |
| 4.1 | | |
| 12.3 | | |
| 20.5 | | |
| 28.7 | | |
| 36.7 | m | 0.48 |
| 44.7 | | |
| 52.5 | n | 0.46 |
| 60.1 | o | 0.44 |
| 67.7 | | |
| 75 | p | 0.41 |
| 82.3 | | |
| 89.1 | q | 0.36 |
| 95.9 | | |
| 102.5 | r | 0.34 |
| 108.9 | s | 0.31 |
| 115.1 | t | 0.29 |
| 120.9 | u | 0.25 |
| 126.7 | | |
| 132.3 | v | 0.23 |
| 137.9 | | |
| 142.4 | w | 0.22 |
| 146.9 | | |
| 151.3 | | |
| 155.7 | | |

| LED POSITION | REGION | CURVATURE RADIUS |
|---|---|---|
| -155.7 | a | 1.136 |
| -151.3 | | |
| -146.9 | | |
| -142.4 | b | 1.087 |
| -137.9 | | |
| -132.3 | | |
| -126.7 | c | 1.000 |
| -120.9 | | |
| -115.1 | d | 0.862 |
| -108.9 | e | 0.806 |
| -102.5 | f | 0.735 |
| -95.9 | g | 0.694 |
| -89.1 | | |
| -82.3 | h | 0.610 |
| -75 | | |
| -67.7 | i | 0.568 |
| -60.1 | | |
| -52.5 | j | 0.543 |
| -44.7 | k | 0.521 |
| -36.7 | | |
| -28.7 | l | 0.500 |
| -20.5 | | |
| -12.3 | | |
| -4.1 | | |
| 4.1 | | |
| 12.3 | | |
| 20.5 | | |
| 28.7 | | |
| 36.7 | m | 0.521 |
| 44.7 | | |
| 52.5 | n | 0.543 |
| 60.1 | o | 0.568 |
| 67.7 | | |
| 75 | p | 0.610 |
| 82.3 | | |
| 89.1 | q | 0.694 |
| 95.9 | | |
| 102.5 | r | 0.735 |
| 108.9 | s | 0.806 |
| 115.1 | t | 0.862 |
| 120.9 | u | 1.000 |
| 126.7 | | |
| 132.3 | v | 1.087 |
| 137.9 | | |
| 142.4 | w | 1.136 |
| 146.9 | | |
| 151.3 | | |
| 155.7 | | |
| | | [mm] |

LIGHT GUIDE, ILLUMINATION DEVICE, AND IMAGE READING APPARATUS

BACKGROUND OF THE INVENTION

1. Field of the Invention

The present invention relates to a light guide, an illumination device, and an image reading apparatus. In particular, the present invention is suitable for an image reading apparatus, such as an image scanner, a copying machine, and a facsimile machine, for reading an image by a line sequential method through illumination of a surface of an original.

2. Description of the Related Art

Conventionally, as an illumination device to be used for an image reading apparatus, such as an image scanner, a copying machine, and a facsimile machine, for reading an image by sequentially and linearly illuminating a surface of an original, a tubular (linear) light source such as a fluorescent lamp has been used. As a result of recent technology development, luminous efficacy of a light emitting diode (LED) has been enhanced, and there has been developed a technology in which the LED is used as the light source to serve as the illumination device. In a case where a point light source such as an LED is used as the light source, multiple point light sources are arrayed in a predetermined direction (main scanning direction).

In this case, when a reading surface such as a surface of an original is directly irradiated with light beams emitted from the multiple point light sources, illuminance unevenness occurs in the main scanning direction, and density unevenness occurs in the image obtained through the reading. Therefore, in the field of the image reading apparatus using multiple point light sources, there have been made inventions intended to reduce the illuminance unevenness in the light source array direction (main scanning direction).

Japanese Patent Application Laid-Open No. 2005-156600 discloses that light diffusing parts are provided at regular intervals along the light source array direction (main scanning direction) so as to diffuse light beams randomly in a range from the light sources to a subject (original), to thereby eliminate the illuminance unevenness. Specifically, each light diffusing part is formed by surface roughening, matte coating, or texturing.

Japanese Patent Application Laid-open No. 2009-80173 discloses that cylinder surfaces each having a positive power (refractive power) in the main scanning direction are periodically provided in a reflecting part of the light guide, to thereby suppress the illuminance unevenness in the main scanning direction.

However, in Japanese Patent Application Laid-Open No. 2005-156600, similarly to a center of the light guide, the light beams are diffused randomly at its edges in the main scanning direction, and hence a large amount of light beams is diffused also in a region other than a predetermined region to be illuminated. Therefore, light use efficiency of the light beams emitted from the light sources becomes lower.

In Japanese Patent Application Laid-Open No. 2009-80173, the cylinder surfaces uniformly and periodically arranged in the main scanning direction are used. As a result, similarly to the center of the light guide, the light beams are diffused at its edges in the main scanning direction, and hence a large amount of light beams is diffused also in a region other than a predetermined region to be illuminated. Therefore, it is required to improve the light use efficiency of the light beams emitted from the light sources. In a case where the multiple light sources are arrayed at irregular intervals, it is further required to suppress the illuminance unevenness in the main scanning direction.

In the case where the multiple light sources are arrayed at irregular intervals, at the edges in the main scanning direction where the light sources are densely arrayed so as to ensure sufficient peripheral light intensity, the degree of light diffusion may be lower than at the center where the light sources are arrayed sparsely. Further, it is important to suppress reduction in efficiency due to the light diffusion beyond the reading range. On the other hand, at the center in the light source array direction (main scanning direction), the light sources are arrayed sparsely, and therefore a diffusion surface having a higher efficiency of diffusion is necessary to reduce local fluctuation in light intensity.

SUMMARY OF THE INVENTION

According to an exemplary embodiment of the present invention, there is provided a light guide, including: a light incident part, to which light enters from light sources arranged at irregular intervals in a predetermined direction so that array of the light sources in the predetermined direction has a sparse region and a dense region; a light guide part for guiding the light entering from the light sources through the light incident part; a reflecting part provided along the predetermined direction, for reflecting the light guided in the light guide part; and a light exit part provided along the predetermined direction, for causing the light reflected on the reflecting part to exit therethrough. At least one of the reflecting part or the light exit part has a light condensing action in a direction intersecting the predetermined direction. The at least one of the reflecting part or the light exit part includes diffusing parts arranged in the predetermined direction. The diffusing parts include: a first curved surface having a first degree of diffusion in the predetermined direction for the sparse region; and a second curved surface having a second degree of diffusion, which is lower than the first degree of diffusion, in the predetermined direction for the dense region. Each of the first curved surface and the second curved surface has a shape corresponding to a part of a cylinder extending in a direction orthogonal to the predetermined direction in which the light sources are arrayed.

Further features of the present invention will become apparent from the following description of exemplary embodiments with reference to the attached drawings.

DESCRIPTION OF THE EMBODIMENTS

Hereinafter, exemplary embodiments of the present invention are described with reference to the attached drawings.

First Embodiment (Image Reading Apparatus)

Figure 13:
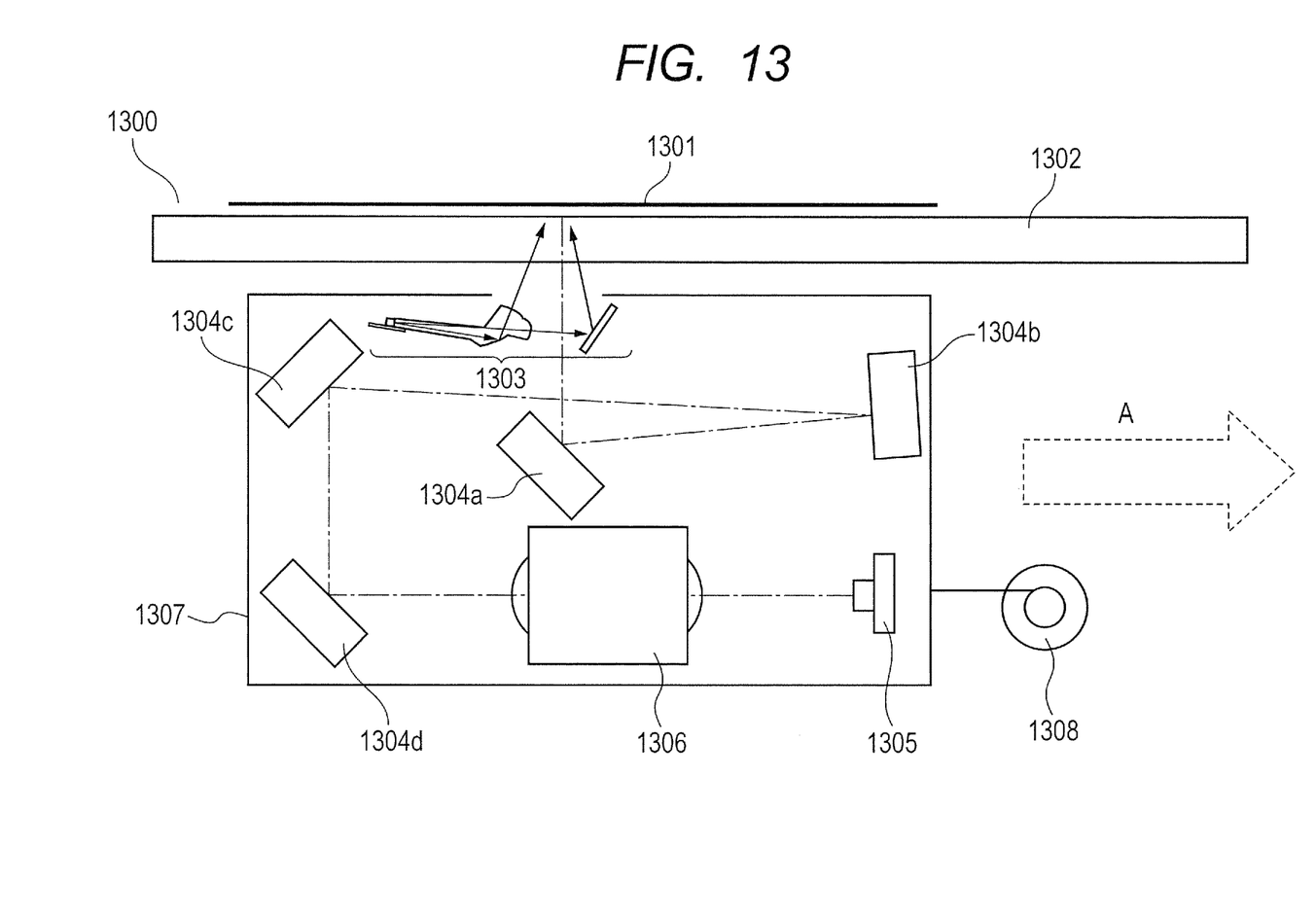
FIG. 13 is an explanatory view illustrating an image reading apparatus using the illumination device according to the embodiments of the present invention.

FIG. 13 is a sub-scanning sectional view of an image reading apparatus 1300 having a light guide and an illumination device mounted thereto according to the embodiments of the present invention. An illumination device 1303 illuminates an original 1301 as a reading subject placed on an original table glass 1302. Light from the illuminated original is reflected on mirrors 1304a to 1304d, and is imaged onto a CMOS line sensor 1305 as a light receptor through an imaging lens 1306. A carriage 1307 houses the illumination device 1303, the mirrors 1304a to 1304d, the imaging lens 1306, and the line sensor 1305. The carriage 1307 is moved in a sub-scanning direction (direction "A" of FIG. 13) by a motor 1308, to thereby read image information in the entire region of the original 1301.

(Light Guide and Illumination Device)

Figure 1A:
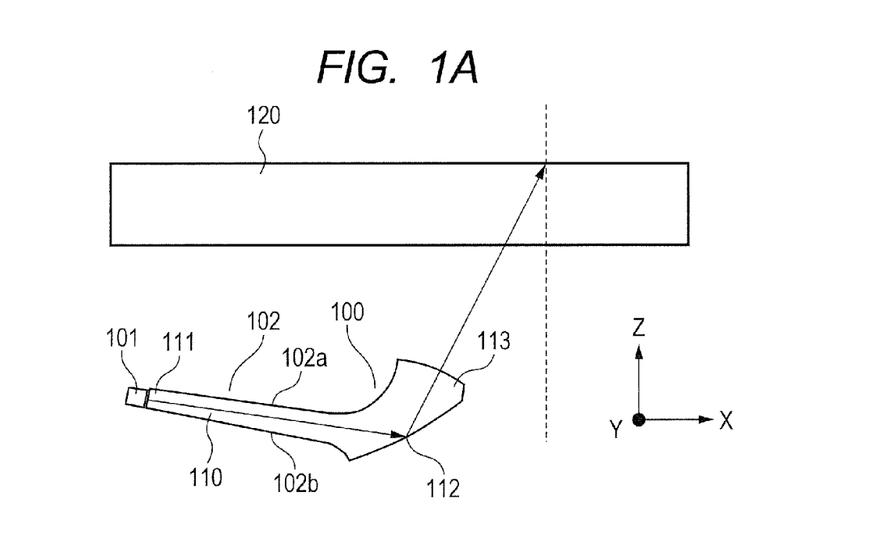
FIG. 1A is a sectional view illustrating an illumination device according to a first embodiment of the present invention.

Referring to FIGS. 1A to 5D, a light guide 110 and an illumination device 100 using the light guide 110 according to a first embodiment of the present invention are described. FIG. 1A is a sub-scanning sectional view (Z-X sectional view) of the illumination device according to this embodiment. Multiple light sources 101 arrayed in a Y direction (main scanning direction) are arranged at a light incident part 111 of the light guide 110. The light guide 110 includes a light guide part 102 for guiding light from the light sources 101 along side surfaces 102a and 102b provided on both sides of the light incident part 111. The light guide 110 further includes a reflecting part 112 provided along the Y direction so as to reflect the light guided in the light guide part 102, and a light exit part 113 provided along the Y direction so as to guide the light reflected on the reflecting part 112 to a surface of the original.

At least one of the reflecting part 112 or the light exit part 113 of the light guide 110 has a light condensing action in an X direction (sub-scanning direction) intersecting the Y direction. Further, the at least one of the reflecting part 112 or the light exit part 113 of the light guide 110 includes multiple diffusing parts arranged in the Y direction.

In FIG. 1A, multiple light beams entering from the multiple light sources 101 are totally reflected at reflection points on the reflecting part 112 having the multiple diffusing parts formed thereon. Then, the light beams exit through the light exit part 113 and pass through an original table glass 120, to thereby illuminate a reading subject region.

In FIG. 1A, the above-mentioned multiple light sources are arrayed in a predetermined direction in the following manner. That is, the light sources 101 formed of multiple light emitting diodes (LEDs) are arrayed at irregular intervals in the Y direction that is a one-dimensional direction. When the illumination device is mounted to the image reading apparatus, the Y direction as the light source array direction corresponds to the main scanning direction. Further, the X direction intersecting the Y direction corresponds to the sub-scanning direction. Note that, in FIG. 1A, a Z direction is a direction orthogonal to the X direction and the Y direction.

Figure 1B:
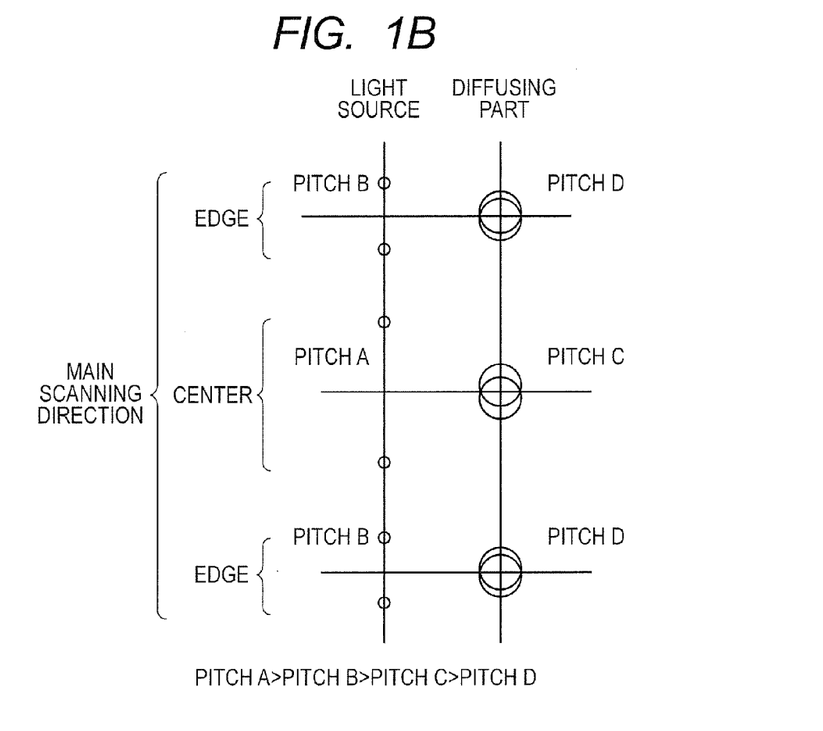
FIG. 1B is a conceptual diagram illustrating arrangement of light sources and diffusing parts in a main scanning direction.

As for the light sources thus arrayed in the predetermined direction (main scanning direction), as illustrated in FIG. 1B, the multiple light sources at a center in the main scanning direction are arrayed more sparsely (at a pitch A) with respect to a predetermined value, whereas the multiple light sources at edges in the main scanning direction are arrayed more densely (at a pitch B smaller than the pitch A) with respect to the predetermined value.

Figure 2:
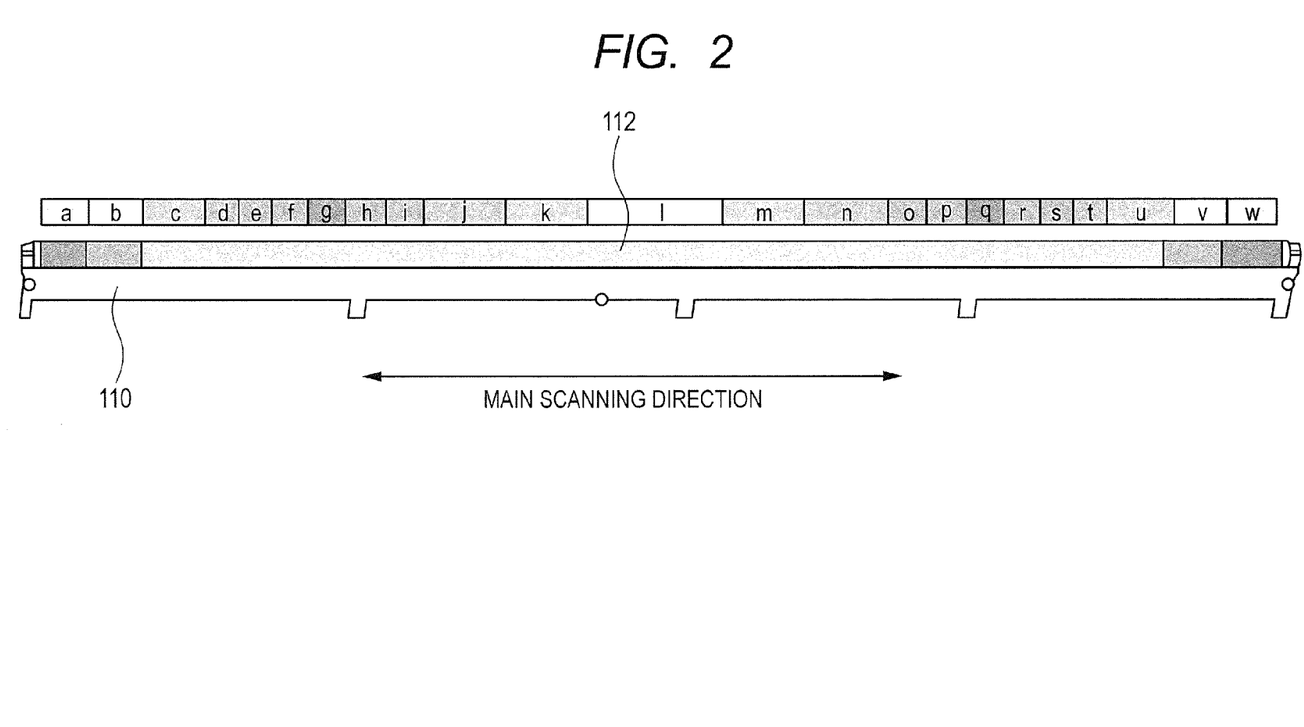
FIG. 2 is a view illustrating array pitches of the main-scanning diffusing parts in a light guide according to the first embodiment of the present invention.

FIG. 2 is a main-scanning sectional view (Y-Z sectional view) of the light guide according to this embodiment. The multiple LED light sources of this embodiment are arrayed in 23 regions (regions "a" to "w") in the main scanning direction (Y direction) at pitches shown in FIG. 3. The light sources are arrayed more densely gradually toward the edges so that emission intensity is set higher at the edges in the main scanning direction than at the center. This is because the LED array has a finite width, and at the edges, light can be obtained only from one side in the main scanning direction. Further, such arrangement is intended to correct field angle characteristics of an imaging optical system that guides the light from the original to the light receiving stage. The field angle characteristics of the imaging optical system are set in comprehensive consideration of, for example, reduction in peripheral light intensity of the imaging optical system, angle characteristics on mirror reflectance for bending the optical path to achieve a compact configuration, and angle characteristics on sensitivity of the light receiving element.

Note that, a material for the light guide 110 is an acrylic resin, and the light guide 110 is formed by injection molding.

(Diffusing Part)

1) Overall Configuration

The diffusing parts include a first curved surface having a first degree of diffusion in the main scanning direction (Y direction) for the sparse region of the light sources in the Y direction, and a second curved surface having a second degree of diffusion, which is lower than the first degree of diffusion, in the Y direction for the dense region of the light sources. Multiple first curved surfaces and multiple second curved surfaces are arrayed in the Y direction. In this case, when assuming that "R" represents a curvature radius of each curved surface of the diffusing part in the Y direction, and "P" represents an array interval thereof, the above-mentioned degree of diffusion corresponds to a value of "P/R".

Figure 3:
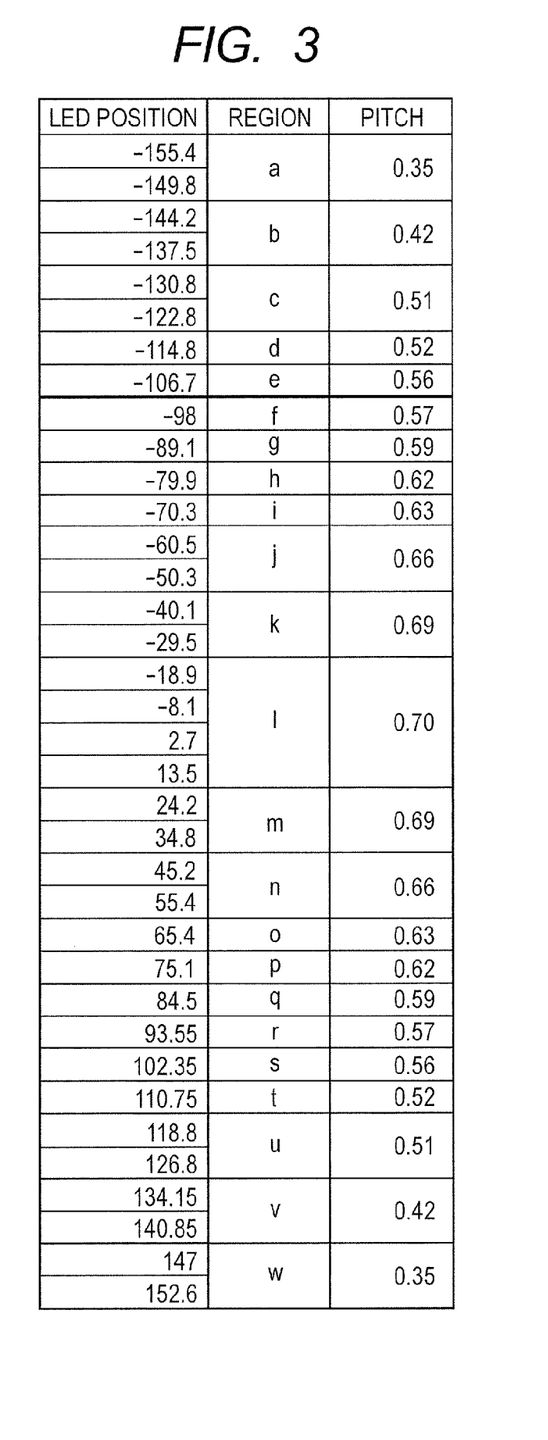
FIG. 3 is an explanatory table showing the array pitches of the main-scanning diffusing parts in the light guide according to the first embodiment of the present invention.

In this embodiment, the diffusing parts arranged in the main scanning direction (Y direction) have in common a constant curvature radius of 1 mm in a cross section taken in the main scanning direction, and are formed to have multiple concave surfaces which are depressed on the light guide side. The diffusing parts are arrayed in 23 separate regions as shown in FIG. 3 corresponding to the array of the light sources at irregular intervals, and arrayed at pitches (intervals) of the concave surfaces which are varied for the respective regions. Specifically, the pitch (interval) is 0.7 mm in the region "l" at the center in the main scanning direction (Y direction), and is 0.35 mm in the regions "a" and "w" at the edges on the outermost side. Thus, the pitch (interval) is set gradually smaller toward the edges in the light source array direction.

Accordingly, the diffusing function is lowered gradually and sequentially toward the edges in the light source array direction. Note that, as shown in FIG. 3, the pitches (intervals) of the diffusing parts are set symmetrically with respect to the region "l" at the center in the main scanning direction. FIG. 1B conceptually illustrates the arrangement, of the diffusing parts in relation with the arrangement of the light sources in the main scanning direction (Y direction). Each diffusing part has a refractive power in the main scanning direction, but does not have the refractive power in the sub-scanning direction intersecting the main scanning direction. That is, the diffusing part has a cylindrical curved surface. For convenience, FIG. 1B illustrates the arrangement on the assumption that the diffusing part has the same refractive power both in the main scanning direction and the sub-scanning direction.

As described above, the light sources at the center are arranged sparsely (at the pitch A), whereas the light sources at both the edges are arranged densely (at the pitch B smaller than the pitch A). On the other hand, the diffusing parts at the center are arranged sparsely (at a pitch C smaller than the pitch A and the pitch B of the light sources) and have a first diffusing function lower in magnitude than a predetermined value, whereas the diffusing parts at both the edges are arranged densely (at a pitch D smaller than the pitch C) and have a second diffusing function higher in magnitude than the predetermined value.

2) Diffusing Action in Main Scanning Direction

Light beams entering the diffusing parts are deflected so as to be temporarily condensed in the main scanning direction (Y direction). However, the optical path after the light beams are condensed is much longer than a focal length thereof, with the result that the light beams travel toward the surface of the original in a diffused state, and form a plane having a diffusing action, in the main scanning direction (Y direction).

3) Shape and Arrangement in Main Scanning Direction

The main-scanning diffusing parts have a shape of multiple concave mirrors which are projected on the air side because the forming die can be processed easily. In a case where the main-scanning diffusing parts have a shape which is projected on the opposite side, the forming die needs to be processed into a shape having small incisions, and hence the processing is generally difficult in this case. If the processing is possible, the main-scanning diffusing parts may be formed to have concave surfaces on the air side.

For the curvature radius R and the pitch P of the diffusing part in the cross section taken in the main scanning direction, it is appropriate to satisfy 0.2<P/R<2. Regarding the lower limit value of 0.2, the diffusing part needs to have a size and shape sufficient to ensure processability of the forming die and reliably fill a resin into the forming die. When the value becomes smaller than 0.2, the forming die has a shape gouged into the molded product, with the result that the processing and molding cannot be performed. On the other hand, when the value of P/R becomes larger than the upper limit value of 2, the projections and depressions become extremely smaller so that a sufficient diffusing effect cannot be expected.

From the viewpoint of the processing and molding, it is preferred that the value be 2 or less, but in order to improve stability of the shape of the molded product, which involves resin filling performance, it is more desired that the value be 1.43 or less. Note that, it is preferred to avoid such a shape that steep portions which may cause filling failure are situated adjacent to each other. Therefore, as the curvature radius is set smaller, the pitch needs to be set smaller as well, and further, as the curvature radius is set larger, the pitch needs to be set larger as well.

Figure 4A:
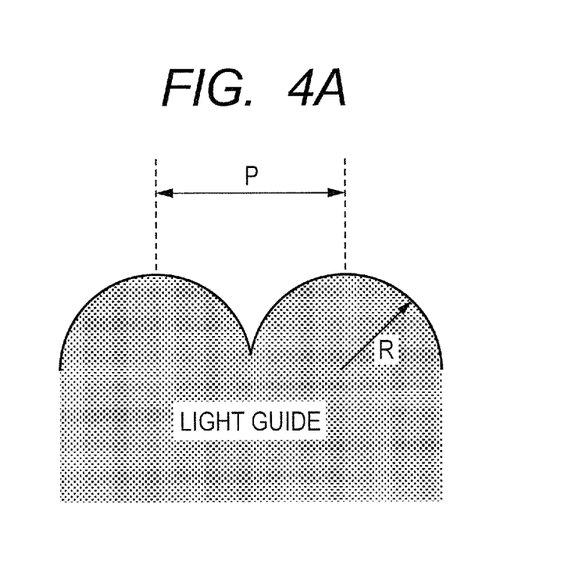
FIG. 4A is an explanatory diagram illustrating a condition of shapes of the main-scanning diffusing parts.
Figure 4B:
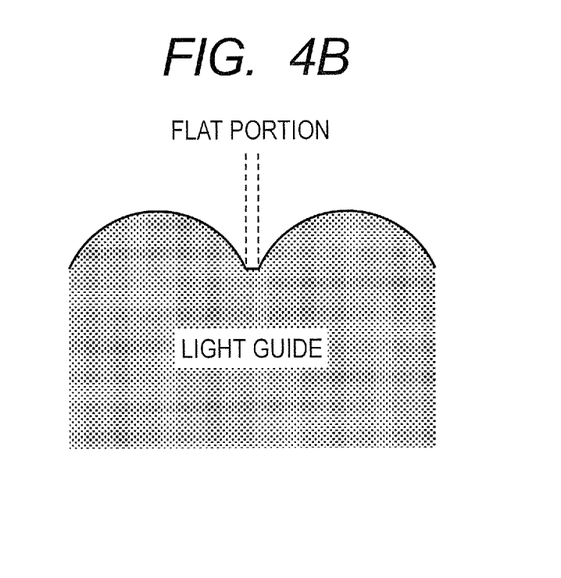
FIG. 4B is an explanatory diagram illustrating a defect occurring in the shapes of the main-scanning diffusing parts.
Figure 5A:
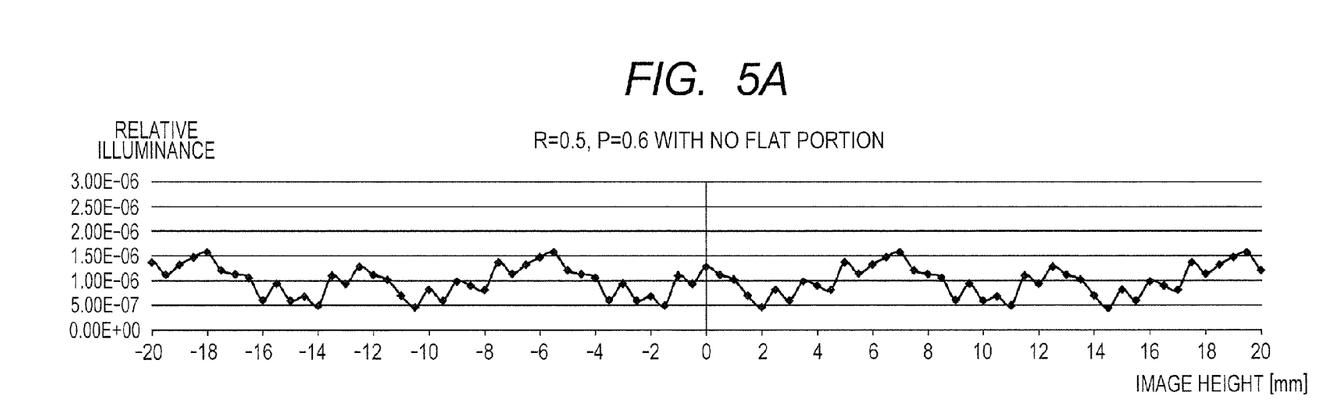
FIG. 5A is an explanatory graph showing a variation in illuminance distribution which occurs due to the defect occurring in the shapes of the main-scanning diffusing parts.
Figure 5B:
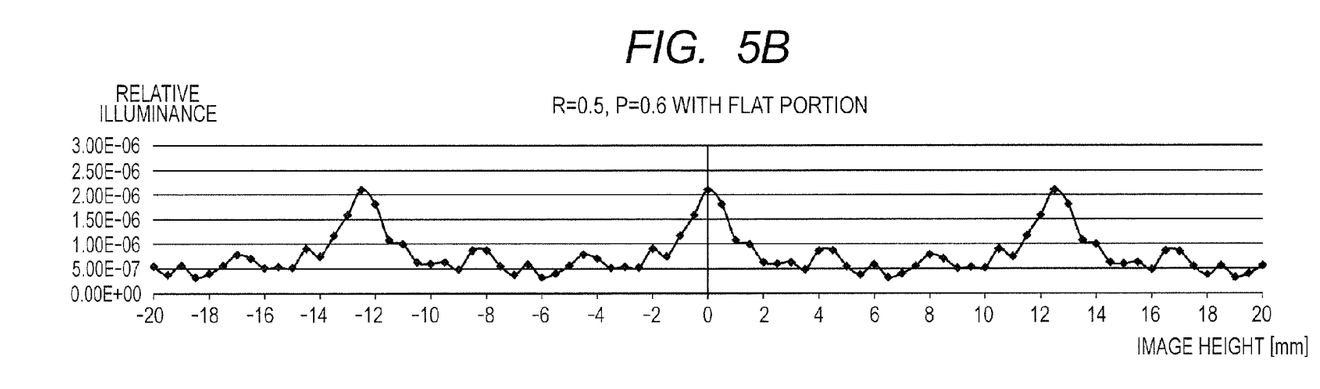
FIG. 5B is an explanatory graph showing a variation in illuminance distribution which occurs due to the defect occurring in the shapes of the main-scanning diffusing parts.

FIGS. 5A and 5B show results of simulation of the illuminance in a case where an original having a large amount of regular reflection components is illuminated under a condition that each diffusing part is not formed into a proper shape and therefore has a flat valley portion as illustrated in FIG. 4B. FIG. 5A shows the results in a case where the diffusing part has a shape with no flat portion, and FIG. 5B shows the results in a case where the diffusing part has a shape with a flat portion.

In this simulation, the curvature radius of the diffusing part is 0.25 mm, and the pitch thereof is 0.3 mm so that P/R=1.2. In the simulation in which the diffusing part has the shape with a flat portion, a flat portion of 0.1 mm is provided on the boundary between adjacent concave surfaces.

Figure 5C:
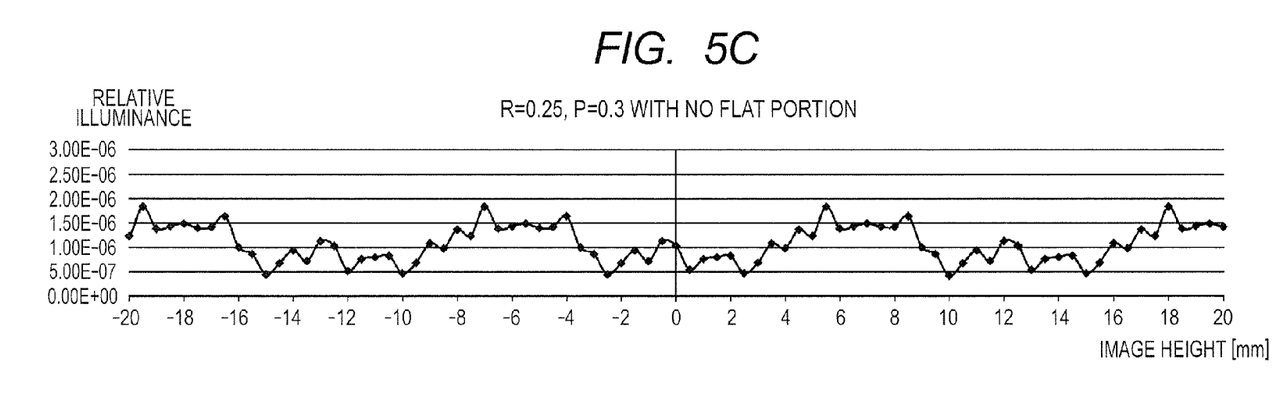
FIG. 5C is an explanatory graph showing a variation in illuminance distribution which occurs due to the defect occurring in the shapes of the main-scanning diffusing parts.
Figure 5D:
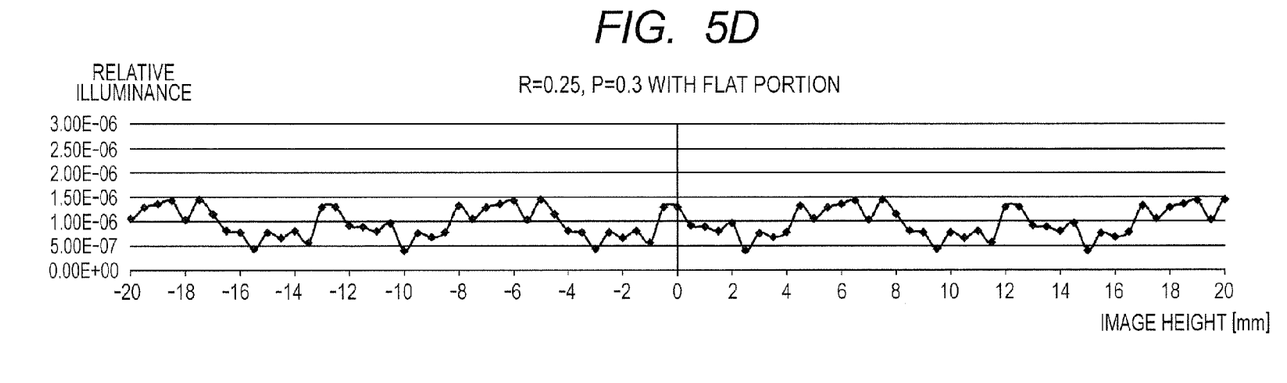
FIG. 5D is an explanatory graph showing a variation in illuminance distribution which occurs due to the defect occurring in the shapes of the main-scanning diffusing parts.

As can be seen from FIGS. 5A and 5B, when the diffusing part has the shape with a flat portion, a ripple occurs in the illuminance distribution. Similarly, FIGS. 5C and 5D show results of simulation of the illuminance in a case where the curvature radius R of the main-scanning diffusing part is 0.5 mm, and the pitch P thereof is 0.6 mm so that P/R=1.2. FIG. 5C shows the results in a case where the main-scanning diffusing part has the shape with no flat portion, and FIG. 5D shows the results in a case where the main-scanning diffusing part has the shape with a flat portion. It is understood that, in the case where R=0.5 (FIG. 5D), the flat portion less affects the results as compared to the case where R=0.25 (FIG. 5B). As described above, even when the value of P/R is constant, the diffusing part having a large value of R or P is higher in resistance to the effect of the shape with a flat portion. In a case where the diffusing part has a large curvature radius R, the curvature radius R is desirably 0.3 mm or more, more desirably 0.5 mm or more for still higher resistance.

Figure 6:
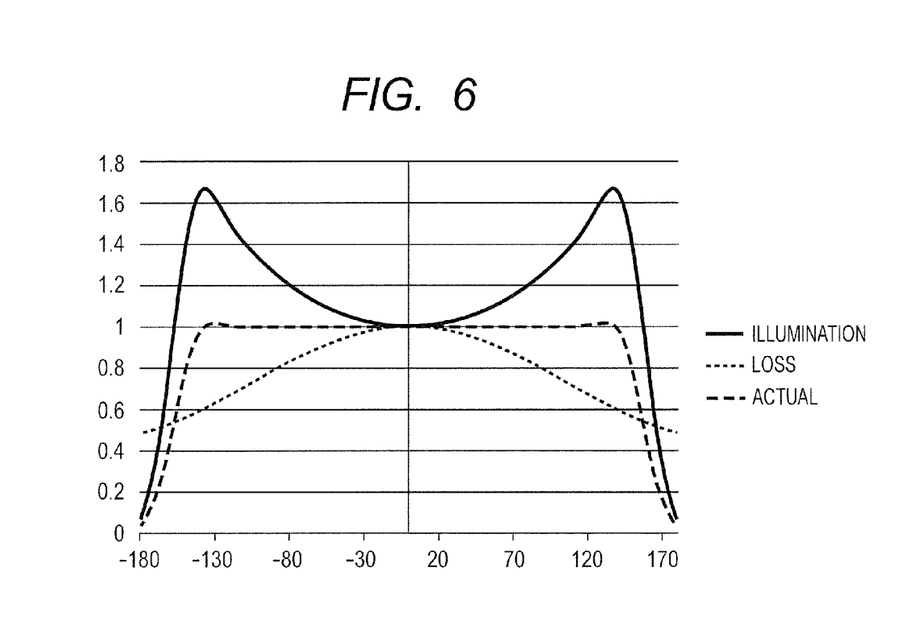
FIG. 6 is an explanatory graph showing an illuminance distribution of the illumination device according to the first embodiment of the present invention.

FIG. 6 shows an illuminance distribution measured at the surface of the original with use of the illumination device according to this embodiment. In FIG. 6, the solid line represents a light intensity distribution measured at the surface of the original, the dotted line represents a loss occurring in the imaging optical system, and the broken line represents a light intensity distribution of light actually reaching the light receptor. Note that, FIG. 6 shows one-dimensional light intensity values obtained by integrating, in the sub-scanning direction, the light intensity values that distribute two-dimensionally in actuality. In FIG. 6, normalization is performed with respect to the respective values at the center in the main scanning direction. In the illumination light intensity distribution represented by the solid line, in the vicinity of the height of about 150 mm of A3 paper size (ISO 126), the value is about 1.7 times as large as the value at the center thereof, but at the edge, the efficiency of the imaging optical system represented by the dotted line is about 0.6 times as small as the efficiency at the center.

Therefore, the light intensity distribution of the light finally received by the line sensor is, as represented by the broken line, substantially uniform over the entire reading region (main scanning region of about ±150 mm).

With the above-mentioned configuration, it is possible to satisfactorily correct the illuminance unevenness due to the discrete array of the LEDs and the ripple due to the main-scanning diffusing parts, to thereby obtain a flat illuminance distribution.

Second Embodiment

Figure 7:
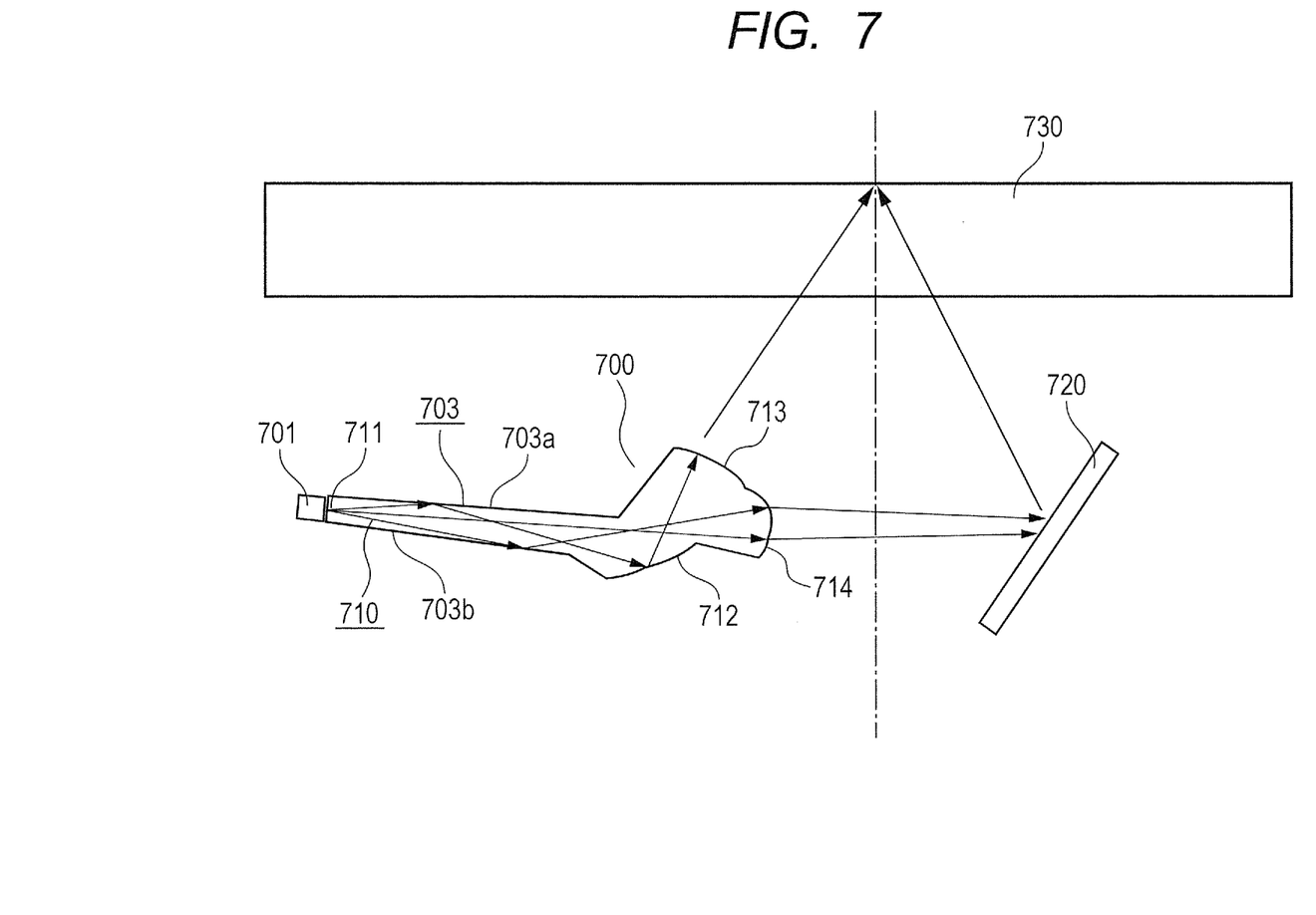
FIG. 7 is a sectional view illustrating an illumination device according to a second embodiment of the present invention.
Figure 8:
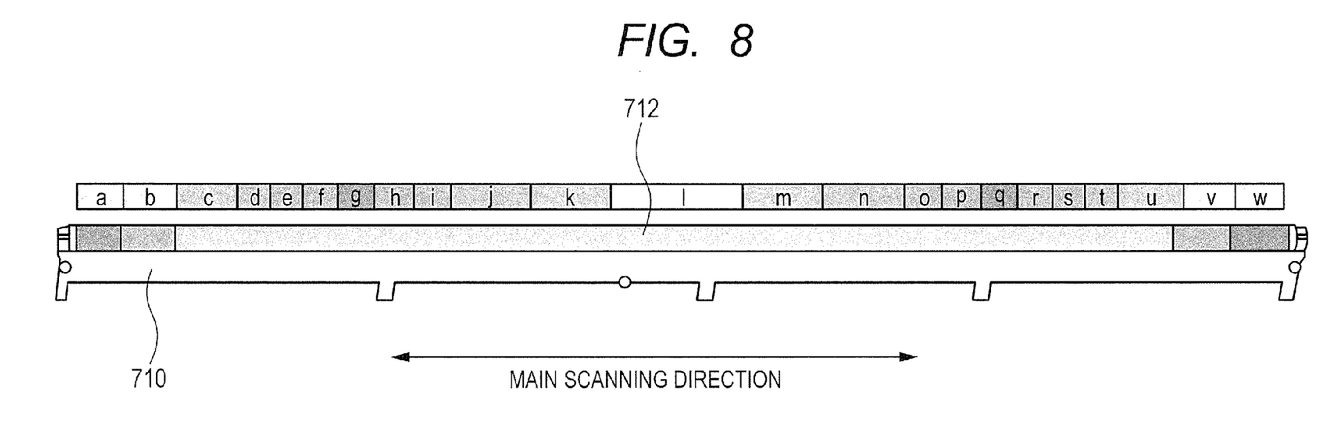
FIG. 8 is a view illustrating array pitches of main-scanning diffusing parts in a light guide according to the second embodiment of the present invention.

Referring to FIGS. 7 to 10, an illumination device 700 for obliquely illuminating an original from both sides according to a second embodiment of the present invention is described. FIG. 7 is a sub-scanning sectional view (Z-X sectional view) of the illumination device for an original that uses a light guide according to this embodiment. Light sources 701 formed of multiple LEDs arrayed in the main scanning direction are arranged at a light incident part 711 of a light guide 710. The light guide 710 includes a light guide part 703 for guiding light from the light sources 701 along side surfaces 703a and 703b provided on both sides of the light incident part 711. Multiple light beams entering from the light sources 701 pass through the light guide part 703, and a part of the light beams is totally reflected upward at reflection points on a reflecting part 712 having multiple diffusing parts formed thereon, and exits through a light exit part 713 toward a surface of the original. A remaining part of the light beams which is not totally reflected on the reflecting part 712 having the multiple diffusing parts formed thereon passes through a light transmitting part 714 toward an opposing reflector 720, and is reflected on the reflector 720 toward the original placed an original table glass 730.

Accordingly, the original is obliquely illuminated from both sides in a symmetrical manner. Note that, similarly to the first embodiment, the light guide of FIG. 7, which is obtained by integrating the components ranging from the light incident part to the light exit part, is made of an acrylic resin and formed by injection molding. The multiple LED light sources 701 according to this embodiment are arrayed in the main scanning direction at pitches illustrated in FIG. 9. The light sources are arrayed more densely gradually toward the edges so that the emission intensity is set higher at the edges in the main scanning direction than at the center for the same reason as in the first embodiment.

Figure 9:
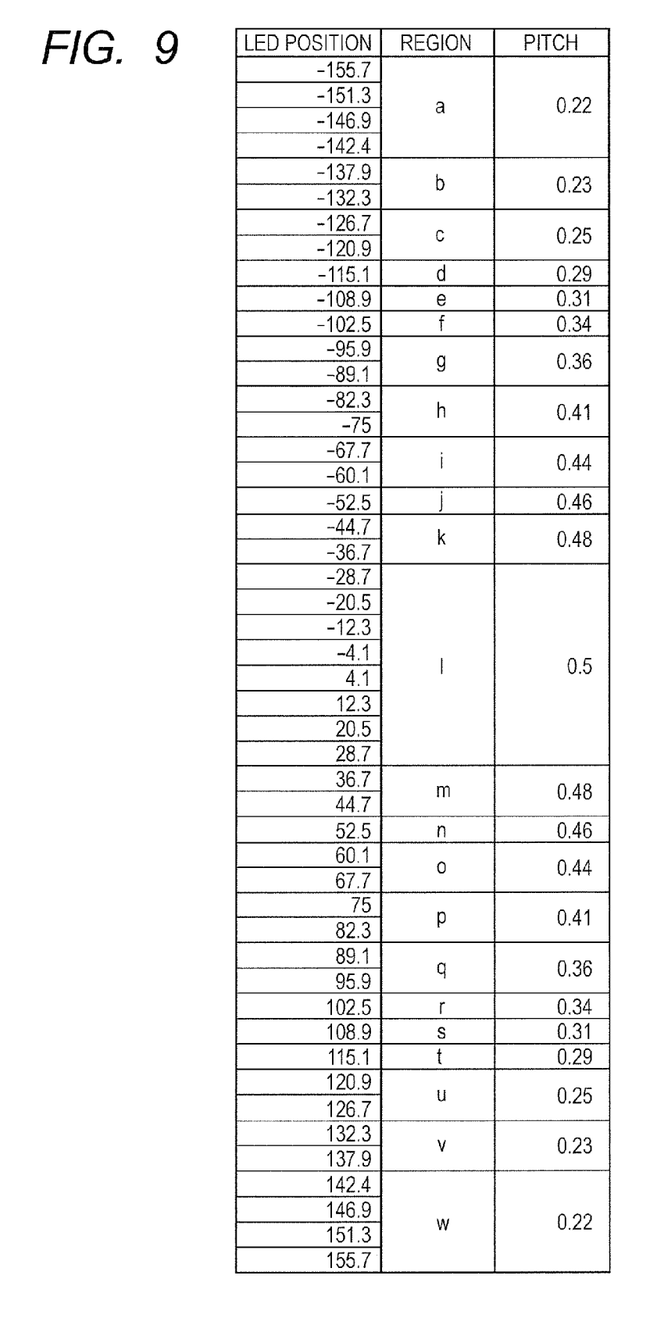
FIG. 9 is an explanatory table showing the array pitches of the main-scanning diffusing parts in the light guide according to the second embodiment of the present invention.

The diffusing parts have a constant curvature radius R of 0.5 mm in the cross section taken in the main scanning direction, and are formed into multiple concave mirrors which are projected on the air side. The diffusing parts are arrayed at intervals varied for the respective 23 regions as shown in FIG. 9 corresponding to the array of the light sources at irregular intervals. The pitch (interval) of each diffusing part is 0.5 mm in the region "l" at the center in the main scanning direction, and is 0.22 mm in the regions "a" and "w" at the edges on the outermost side. Thus, the pitch (interval) is set gradually smaller toward the edges. Further, the P/R ratio ranges from 0.44 to 1, which achieves both the stability against the shape with a flat portion and the diffusion efficiency. Note that, as shown in FIG. 9, the pitches (intervals) of the diffusing parts are set symmetrically with respect to the region "l" at the center in the main scanning direction.

Figure 10:
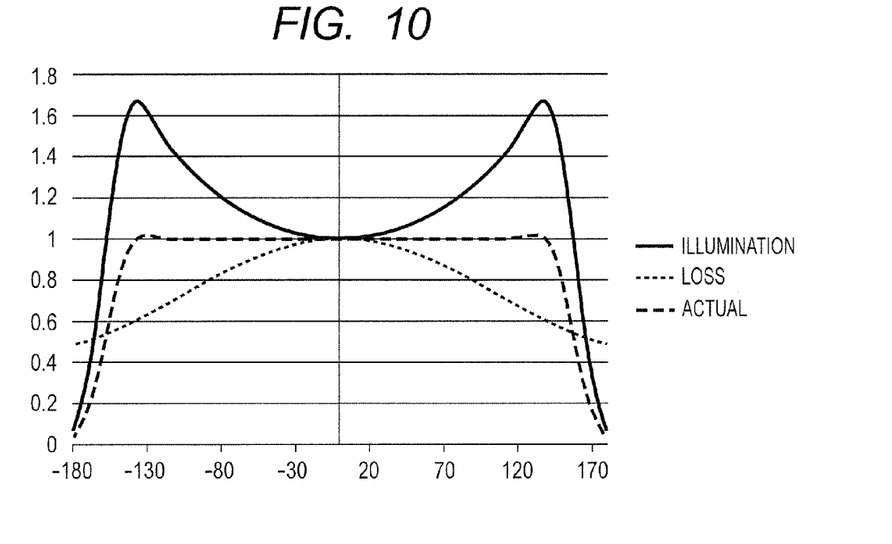
FIG. 10 is an explanatory graph showing an illuminance distribution of the illumination device according to the second embodiment of the present invention.

FIG. 10 shows an illuminance distribution measured at the surface of the original with use of the illumination device according to this embodiment. In FIG. 10, the solid line represents a light intensity distribution measured at the surface of the original, the dotted line represents a loss occurring in the imaging optical system, and the broken line represents a light intensity distribution of light actually reaching the light receptor. FIG. 10 shows one-dimensional light intensity values obtained by integrating, in the sub-scanning direction, the light intensity values that distribute two-dimensionally in actuality.

With the above-mentioned configuration, it is possible to satisfactorily correct the illuminance unevenness due to the discrete array of the light sources and the ripple due to the main-scanning diffusing parts, to thereby obtain a flat illuminance distribution.

Third Embodiment

In the embodiments described above, of the curvature radius R and the array interval (pitch) P of the main-scanning diffusing part, the curvature radius R is set constant and the pitch is set variable. In a third embodiment of the present invention, the curvature radius R and the pitch are set inconstant.

Figure 11:
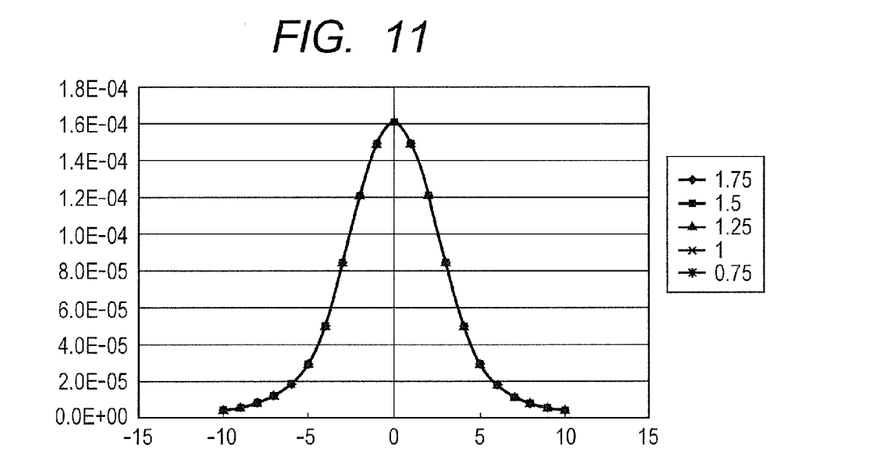
FIG. 11 is a graph showing results of simulation of an illuminance distribution in the main scanning direction for a light guide according to a third embodiment of the present invention.
Figure 12:
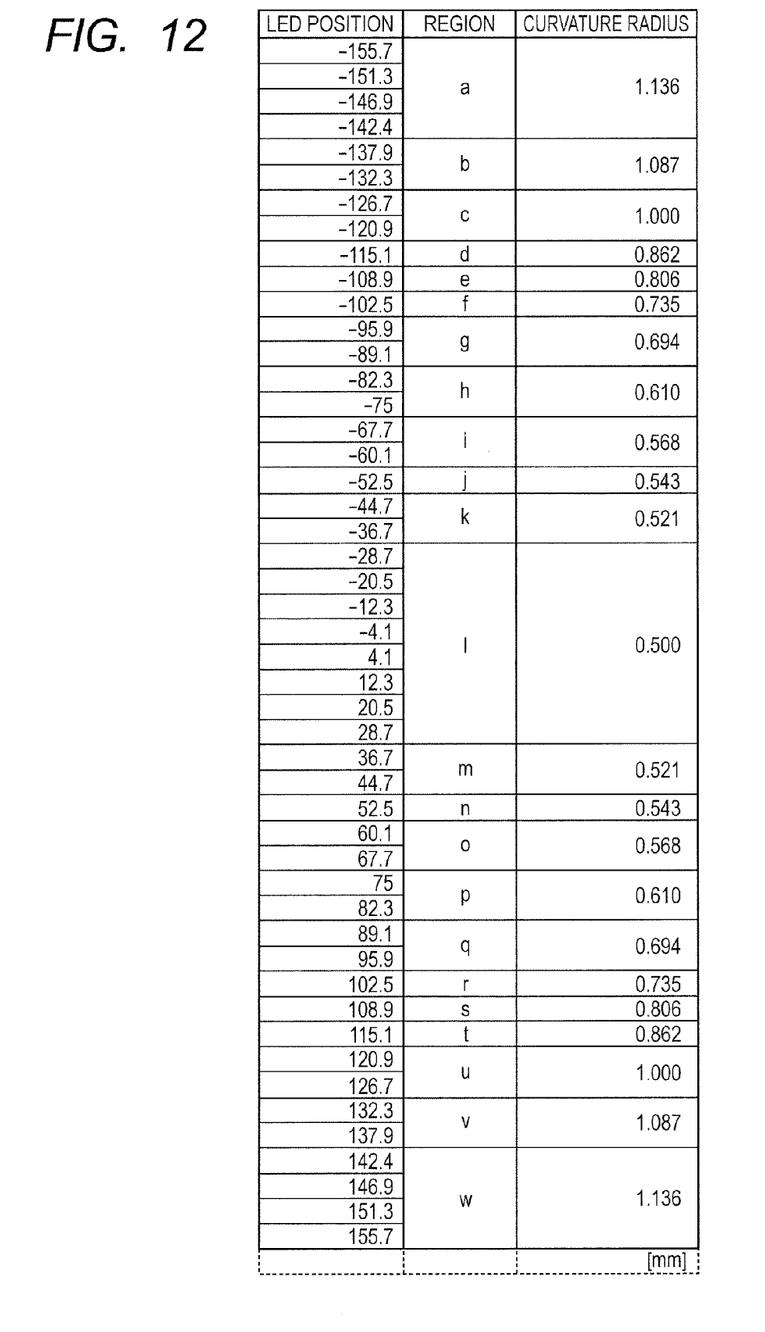
FIG. 12 is an explanatory table showing array pitches of main-scanning diffusing parts in the light guide according to the third embodiment of the present invention.

FIG. 11 shows results of simulation of the illuminance distribution in the main scanning direction in a case where the value of the curvature radius R is varied from 0.75 to 1.75 while maintaining the value of P/R for the respective regions of the main-scanning diffusing parts shown in FIG. 9. When the value of the curvature radius R is set variable, an illumination device having the same effects as in the above-mentioned embodiments can be attained. FIG. 12 shows curvature radii of the main-scanning diffusing parts in the 23 regions "a" to "w". Note that, as shown in FIG. 12, the pitches (intervals) of the diffusing parts are set symmetrically with respect to the region "l" at the center in the main scanning direction.

Modification Example 1

In the first and second embodiments, the refractive power of each diffusing part in the main scanning direction is constant, and the array interval (pitch) thereof is inconstant. In the third embodiment, the refractive power of each diffusing part in the main scanning direction and the array interval (pitch) thereof are inconstant. The present invention is not limited thereto, and the array interval (pitch) of each diffusing part in the main scanning direction may be constant, and the refractive power thereof may be inconstant. In this case, it is preferred that, in relation with the curvature radius of the diffusing part, the refractive power be set symmetrical in the main scanning direction.

Modification Example 2

In the embodiments described above, the center of the light incident part in the main scanning direction corresponds to the sparse region of the light sources, and the edges of the light incident part in the main scanning direction each correspond to the dense region of the light sources, but the present invention is not limited thereto. For example, one edge of the light incident part in the main scanning direction may correspond to the sparse region of the light sources, and the other edge of the light incident part in the main scanning direction may correspond to the dense region of the light sources. Also in this case, the diffusing part includes the first curved surface having the first degree of diffusion in the main scanning direction for the sparse region, and the second curved surface having the second degree of diffusion, which is lower than the first degree of diffusion, in the main scanning direction for the dense region.

Modification Example 3

In the embodiments described above, the multiple diffusing parts are provided to the reflecting part 112 or 712, but may be provided to the light exit part 113. Alternatively, the diffusing parts may be provided both to the reflecting part 112 and to the light exit part 113.

Modification Example 4

In the embodiments described above, the diffusing part has the cylindrical curved surface so as to utilize the diffusing action after temporary condensing of light, but the cross section taken in the array direction is not limited to the arc. The present invention is also applicable to a surface which is deemed to be an approximate circular shape projected on the air side (for example, curved surface obtained by shaping multiple flat surfaces into a curved surface).

Modification Example 5

In the embodiments described above, the LED is used as the light source, but the present invention is also applicable to a light source which is not a linear light source alone.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-214417, filed Sep. 29, 2011, which is hereby incorporated by reference herein in its entirety.

What is claimed is:

1. A light guide, comprising:
   a light incident part, to which light enters from light sources arranged in a first direction so that array of the light sources has a sparse region and a dense region;
   a light guide part for guiding the light entering from the light sources through the light incident part;
   a reflecting part for reflecting the light guided in the light guide part; and
   a light exit part for causing the light reflected on the reflecting part to exit therethrough,
   wherein at least one of the reflecting part or the light exit part has a light condensing action in a first section perpendicular to the first direction,
   wherein the at least one of the reflecting part or the light exit part comprises first and second curved surfaces arranged in the first direction,
   wherein the first curved surface diffuses light from the sparse region in a second section parallel to the first direction by a first degree of diffusion, the second curved surface diffuses light from the dense region in the second section by a second degree of diffusion which is smaller than the first degree of diffusion.

2. The light guide according to claim 1, wherein each of the first degree of diffusion and the second degree of diffusion is represented by "P/R" where "R" represents a curvature radius of the each of the first curved surface and the second curved surface in the second section, and "P" represents an array interval thereof.

3. The light guide according to claim 1, wherein a center of the light incident part in the first direction corresponds to the sparse region, and edges of the light incident part in the first direction each correspond to the dense region.

4. The light guide according to claim 1, wherein a curvature radius of the each of the first curved surface and the second curved surface in the second section comprises a constant curvature radius.

5. The light guide according to claim 1,
   wherein a curvature radius of the each of the first curved surface and the second curved surface in the second section comprises an inconstant curvature radius, and
   wherein an array interval thereof comprises an inconstant array interval.

6. The light guide according to claim 1, wherein an array interval of the each of the first curved surface and the second curved surface comprises a constant array interval.

7. The light guide according to claim 2, wherein $0.2 < P/R < 2$ is satisfied.

8. An illumination device comprising light sources arranged in a first direction and a light guide configured to guide light from the light sources,
   wherein the light sources are arranged in the first direction to have a first region where the light sources are arranged sparsely and a second region where the light sources are arranged densely,
   wherein the light guide has a light incident part from which light from the light sources is incident, a light guide part configured to guide light from the light incident part, a reflecting part configured to reflect light from the light guide part, and a light exit part from which light from the reflecting part exits,
   wherein at least one of the reflecting part and the light exit part has a condensing function in a first section perpendicular to the first direction and includes first and second curved surfaces arranged in the first direction, and
   wherein the first curved surface diffuses light from the first region in second section parallel to the first direction by a first degree of diffusion and the second curved surface diffuses light from the second region in the second section by a second degree of diffusion which is smaller than the first degree of diffusion.

9. The illumination device according to claim 8, wherein the first and second degrees of diffusion is expressed by P1/R2 and P2/R2 respectively, where R1 and R2 represent curvature radii of the first and second curved surfaces in the second section respectively, and P1 and P2 represent arrangement intervals of the first and second curved surfaces respectively.

10. The illumination device according to claim 9, wherein $0.2 < P1 < R1 < 2,$ $0.2 < P2 < R2 < 2,$ are satisfied.

11. The illumination device according to claim 8, wherein the light from the first region enters a central portion of the light incident part in the first direction and the light from the second region enters both edge portions of the light incident part in the first direction.

12. The illumination device according to claim 8, wherein curvature radii of the first and second curved surfaces in the second section are constant.

13. The illumination device according to claim 8, wherein curvature radii and arrangement intervals of the first and second curved surfaces in the second section are not constant.

14. The illumination device according to claim 8, wherein arrangement intervals of the first and second curved surfaces are constant.

15. The illumination device according to claim 8, wherein the first and second curved surfaces are convex toward the other side of the light incident part in the second section.

16. The illumination device according to claim 8, wherein the first and second curved surfaces are cylindrical curved surfaces.

17. The illumination device according to claim 8, wherein the first and second curved surfaces are arranged symmetrically in the first direction.

18. The illumination device according to claim 8, wherein the light guide includes a light transmitting part through which light from the light incident part passes without reflected on the reflecting part.

19. The illumination device according to claim 18, comprising a reflector configured to reflect light from the light transmitting part.

20. An image reading apparatus comprising light sources arranged in a first direction, a light guide configured to guide light from the light sources to an original, and a light receiving unit configured to receive light from the original,
 wherein the light sources are arranged in the first direction to have a first region where the light sources are arranged sparsely and a second region where the light sources are arranged densely,
 wherein the light guide has a light incident part from which light from the light sources is incident, a light guide part configured to guide light from the light incident part, a reflecting part configured to reflect light from the light guide part, and a light exit part from which light from the reflecting part exits,
 wherein at least one of the reflecting part and the light exit part has a condensing function in a first section perpendicular to the first direction and includes first and second curved surfaces arranged in the first direction, and
 wherein the first curved surface diffuses light from the first region in second section parallel to the first direction by a first degree of diffusion and the second curved surface diffuses light from the second region in the second section by a second degree of diffusion which is smaller than the first degree of diffusion.

* * * * *